Figure 1:
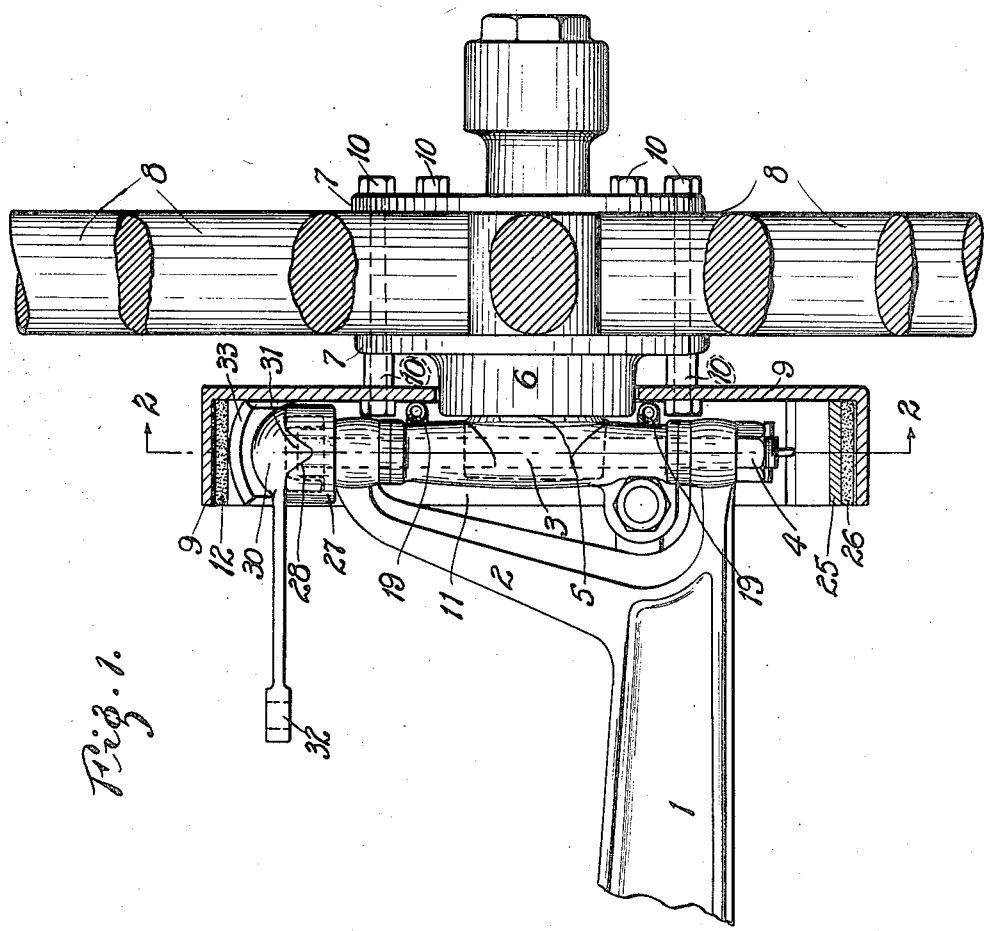

Jan. 13, 1925. 1,523,121
E. G. HEINZELMAN
FRONT WHEEL BRAKE
Filed Aug. 18, 1923 2 Sheets-Sheet 1

Inventor:
Edmund G. Heinzelman
by
his Attorneys.

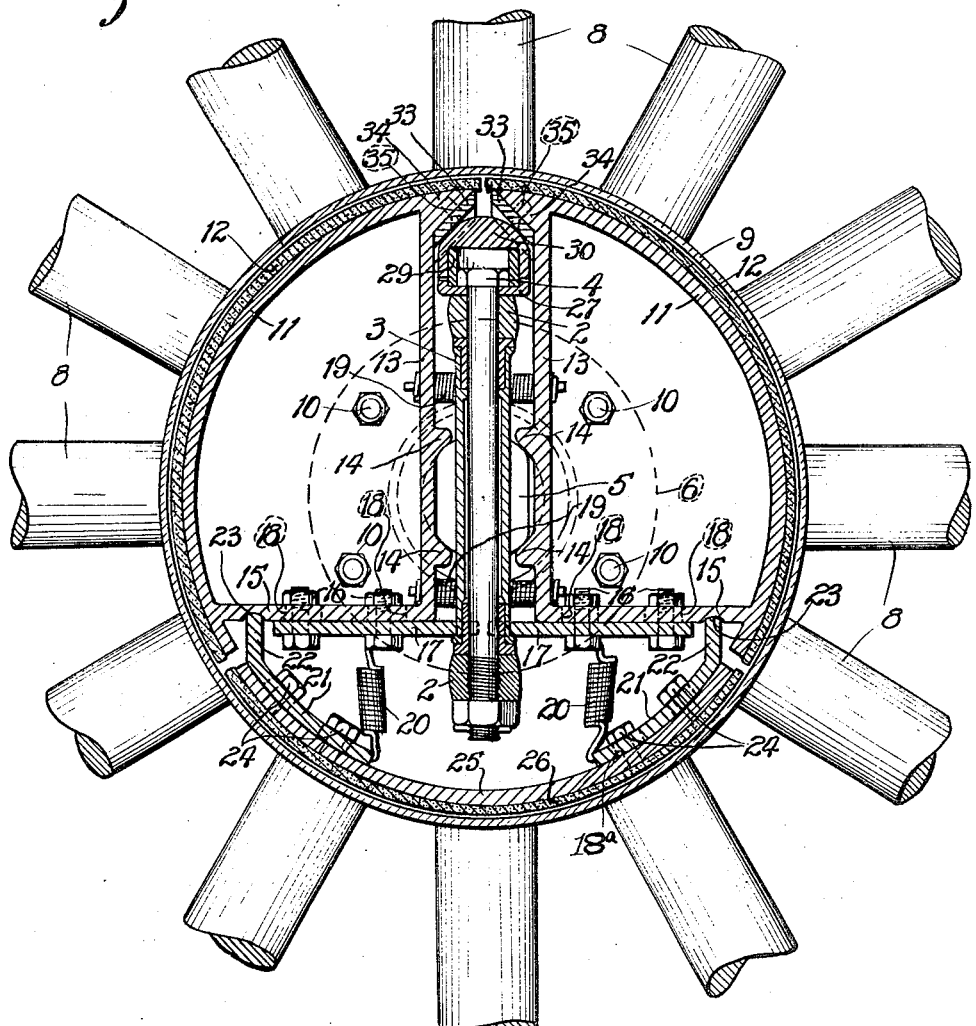
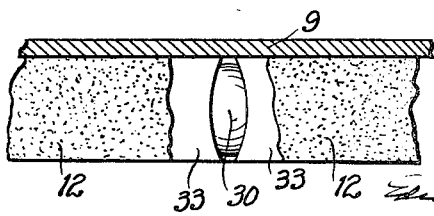

Patented Jan. 13, 1925.

1,523,121

UNITED STATES PATENT OFFICE.

EDMUND G. HEINZELMAN, OF BELLEVILLE, ILLINOIS.

FRONT-WHEEL BRAKE.

Application filed August 18, 1923. Serial No. 658,037.

*To all whom it may concern:*

Be it known that I, EDMUND G. HEINZELMAN, a citizen of the United States, and a resident of the city of Belleville, in the county of St. Clair and State of Illinois, have invented a new and useful Improvement in Front-Wheel Brakes, of which the following is a specification.

My invention relates to front wheel brakes and has for its principal object to produce a brake that can be applied to the front or steering wheel of an automobile or other vehicle that is light, simple and easy to operate and that can be applied to vehicles already in use. The invention consists principally in means for mounting a brake on the steering knuckle of a vehicle wheel so as to swing with the wheel and cooperate with a brake drum thereon. The invention further consists in the brake and in the parts and combinations of parts hereinafter described and claimed.

In the accompanying drawing wherein like reference numerals refer to like parts wherever they occur, Fig. 1 is an elevation of the end portion of an axle and a steering wheel equipped with a brake according to my invention, the brake drum and the brake shoes being shown in section, Fig. 2 is a vertical sectional view on the line 2—2 of Fig. 1, Fig. 3 is a detail view of the adjacent ends of the brake shoes, showing the means for spreading said shoes.

A common type of automobile front wheel construction comprises an axle 1 having a forked end portion 2, a steering knuckle 3 secured between the forks 2 of the axle by means of a substantially vertical bolt or knuckle pin 4, a stub axle or spindle 5 integral with and projecting substantially horizontally from said steering knuckle, a hub member 6 rotatably mounted on said stub spindle, said hub member having laterally projecting annular flanges 7, and wheel spokes 8 mounted on said hub member between the flanges thereof.

According to the present invention a brake drum 9 is secured to the wheel, as by being secured to a flange 7 of the hub portion 6 of the wheel by bolts 10. Brake shoes 11 are mounted within the brake drum on either side of the steering knuckle 3. Preferably said brake shoes 11 are castings that have an arcuate portion extending through about one-third of a circle, and provided with a facing or brake lining 12 adapted to engage the brake drum 9. One wall 13 of each casting extends alongside of the steering knuckle and has portions 14 that are shaped to engage the steering knuckle 3 when the brake is in inactive position. Secured to the wall 15 of each casting that extends transversely of the steering knuckle 3, as by screws 16, is a plate 17 that has its end portion recessed to conform to the shape of the steering knuckle. The holes 18 (shown in dotted lines) in the casting 11 through which the screws or bolts 16 pass are elongated so that the position of the plates relative to the casting can be adjusted.

The brake shoes or castings 11 are connected together by tension springs 19 so that they are normally pulled toward each other with their braking surfaces free from the brake drum.

Tension springs 20 working substantially at right angles to the springs 19 are secured to the brake shoes or castings 11 and to strips 21 that have their end portion 22 bent to engage the castings substantially at right angles thereto. The ends of the strips 21 are rounded to fit in rounded depressions 23 in the bottom walls 15 of the brake shoe castings 11 so that the strips are centered with respect to the brake shoes. Secured to the strips 21 by suitable screws 24, which extend through elongated holes 18$^a$ (shown in dotted lines) to permit adjustment of the brake shoe 25, is an arcuate brake shoe 25 that fills most of the gap between the ends of the counterpart brake shoes 11 above described. A suitable brake lining 26 is secured in the brake shoe.

Mounted on a fork 2 of the axle and clamped thereto by means of the head of the steering knuckle bolt 4 is a centrally perforated disk or washer 27 that has an annular flange at its margin. This flange is provided with oppositely disposed notches 28 in the end thereof the walls of said notches being inclined to form cam surfaces. A hollow shell 29 is located inside the flange of said washer. A head 30 of partly spherical shape rests on said flanged washer 27 and has portions 31 projecting therefrom that fit in the notches of the tubular member as shown in Fig. 1. Said head 30 is provided with a lever arm 32 that is connected up with any suitable operating means (not shown in the drawings) whereby the head 30 may be rotated. The head bears against cooperating wear plates 33 that are secured to the overhanging ends 34 of the counterpart brake shoes 11, as by screws 35. The wear plates are preferably of concave curvature to fit the spherical head.

When the head 30 is rotated, the projections 31 thereof ride over the cam surfaces formed by the walls of the notches 28 in the flange of the washer 27 causing the head to move upwardly relative to the axle, transverse movement of said head being prevented by the hollow shell 29. As the head 30 moves endwise it bears against the overhanging ends 34 of the brake shoes 11 and spreads them apart, causing them to be forced against the brake drum. The shoes fulcrum about the end of the steering knuckle at the point where the plates 17 engage the steering knuckle. As the brake shoes 11 are moved into engagement with the brake drum, the walls 15 thereof move the strips 21 outwardly thus causing the brake shoe 25 to be moved into engagement with the brake drum. When the head 30 is released the springs 19 and 20 strip all the brake shoes from the brake drum and the parts of the brake mechanism are returned to normal position.

The brake turns with the steering knuckle and is received thereto by the portions of the castings and by the plates.

The brake hereinbefore described is simple and easy to operate and obviously it may be applied to wheels of vehicles already in use as well as to new vehicles. For instance, in the case of an ordinary Ford car, the steering wheel is removed from its spindle and the brake drum bolted to the inner side thereof concentric with its bearings. The knuckle bolt is then removed from the yoke of the axle, the flanged washer 27 is placed on top of the yoke and the knuckle bolt is passed through said washer and replaced. The hollow shell 29 is then placed inside the flanged washer surrounding the bolt head, and the head 30 is then set down over said shell. The brake members are then placed in position, with the adjustable plates 17 straddling the steering knuckle and with the end fittings of the counterpart brake members bearing on the spherical head of the cam member 30. The wheel is then replaced on the spindle with its brake drum encircling the brake shoes and in operative relation therewith. The lever arm of the spherical brake member 32 is operatively connected to a foot lever in position for convenient manipulation by the driver. Thus, the brake may be mounted as an attachment to cars already in service and without altering or discarding any of the parts of such cars.

Obviously, numerous changes may be made without departing from the invention and I do not wish to be limited to the precise construction shown.

What I claim is:

1. A brake for a steering wheel comprising a washer fixed at the top of the steering fork and having an upturned annular flange with cam teeth thereon, a second cam member rotatably mounted and having an upper bearing surface and a lower portion provided with cam teeth adapted for cooperation with said first mentioned cam teeth to be moved thereby when said second cam member is rotated, brake members straddling the lower portion of the steering knuckle above the bottom member of said fork and having their free ends in operative engagement with said bearing surface of said second cam member to be actuated thereby.

2. A brake for a steering wheel comprising a washer fixed at the top of the steering fork and having an upturned annular flange with cam teeth thereon, a second cam member rotatably mounted and having an upper spherical surface and a lower portion provided with cam teeth adapted for cooperation with said first mentioned cam teeth to be moved upwardly thereby when said second cam member is rotated, a pair of brake members straddling the lower portion of the steering knuckle and having their free ends in operative engagement with said spherical member to be actuated thereby, and a third brake member operatively connected to first mentioned brake members to be operated thereby.

3. A brake attachable to a finished automobile comprising members shaped to straddle and engage the steering knuckle of such automobile when the brake is in inactive position and having brake shoes, a cam member adapted to be secured by the knuckle pin, a second cam member rotatably mountable in operative relation to said first mentioned cam member to be moved thereon, and means for effecting rotary movement of said second cam member, adjacent ends of said brake shoes being in position to be actuated by said second cam member.

4. A brake attachable to a finished automobile comprising members adapted to straddle the steering knuckle of such automobile and having brake shoes, a cam member adapted to be secured by the knuckle pin and having an annular rib with cam teeth thereon, a sleeve inside said rib, a second cam member rotatably mountable and having an annular rib outside of said sleeve and cam teeth thereon adapted to cooperate with said first mentioned teeth, said second cam member having its outer surface adapted to bear against the adjacent ends of said brake shoes to spread the same, and means for effecting rotary movement of said second cam member.

5. A brake attachable to a finished automobile comprising members adapted to straddle the steering knuckle of such automobile and having brake shoes, a cam member adapted to be secured by the knuckle pin and having an annular rib with cam teeth thereon, a sleeve inside said rib, a second cam member rotatably mounted and having an annular rib outside of said sleeve and cam teeth thereon adapted to cooperate with said first mentioned teeth said second cam member having its outer surface adapted to bear against the adjacent ends of said brake shoes to spread the same, and means for effecting rotary movement of said second cam member, adjacent ends of said brake shoes being in position to be actuated by said second cam member, and a third brake shoe hung from said first mentioned members and operable thereby.

Signed at St. Louis, Mo., this 16th day of August, 1923.

EDMUND G. HEINZELMAN.